Patented Feb. 4, 1941

2,230,970

UNITED STATES PATENT OFFICE 2,230,970

PURIFICATION OF CRUDE ISOCYTOSINE

Jackson P. English, Stamford, Conn., assignor to American Cyanamid Company, New York, N. Y., a corporation of Maine No Drawing. Application April 26, 1940, Serial No. 331,752

3 Claims. (Cl. 260—251)

This invention relates to a method of purifying crude isocytosine.

Isocytosine has been produced by several methods including an improved method involving condensation of guanidine salts with crude mixtures containing formyl acetic acid as described in the copending application of Roblin and English, Serial No. 331,754, filed April 26, 1940, now issued as Patent No. 2,224,836, December 10, 1940. The isocytosine produced by various processes including those of the Roblin and English application above referred to is not sufficiently pure for use as an intermediate for preparing 2-amino pyrimidine and normally it requires purification by various means such as recrystallization. This, however, takes time and results in some loss in yield.

The present invention is based on my discovery of the fact that the impurities in crude isocytosine and particularly in crude isocytosine produced by the condensation of guanidine with formyl acetic acid are soluble in dilute sulfuric acid, whereas the isocytosine is not. According to the present invention, therefore, crude isocytosine is treated with dilute sulfuric acid, for example 10% sulfuric acid, and then filtered. A good yield of purified isocytosine sulfate is obtained with practically no loss.

The concentration of sulfuric acid to be used is not critical so long as it is dilute and there is sufficient present to solubilize the impurities. Acids much weaker than 10% do not purify as thoroughly and but little effect is obtained if the acid is much below this strength. Concentrations above 10% do not give materially better results and hence do not justify their greater cost.

The invention will be described in greater detail in conjunction with the following specific examples which are illustrative only. The parts are by weight except as to sulfuric acid where they are the corresponding parts by volume.

Example 1

267 parts of crude isocytosine produced by the condensation of guanidine with formyl acetic acid and having a melting point with decomposition of 253–255° C. are stirred with about 500 parts of 10% sulfuric acid for about 45 minutes at room temperature. The mixture is then filtered, the solid is washed well with water and dried at about 60° C. The yield is 242 parts of light-colored isocytosine sulfate melting with decomposition at 275–277° C. which is sufficiently pure for use as an intermediate in the production of 2-amino pyrimidine.

Example 2

A reaction mixture containing crude isocytosine produced by the reaction of a guanidine salt with a mixture containing formyl acetic acid prepared by the reaction of malic acid with fuming sulfuric acid is poured into sufficient water to produce a mixture containing about 10% sulfuric acid. This mixture is allowed to stand for about 45 minutes at room temperature and then filtered and the solid washed well with water and dried at about 60° C. The purified light-colored isocytosine sulfate is sufficiently pure for use as an intermediate in the production of 2-amino pyrimidine.

What I claim is:

1. A method of purifying crude isocytosine which comprises suspending the crude isocytosine in a dilute aqueous sulfuric acid solution and filtering off acid soluble impurities therefrom.

2. A method of purifying crude isocytosine produced by the condensation of guanidine salts with a crude mixture containing formyl acetic acid prepared by the reaction of fuming sulfuric acid and malic acid which comprises suspending the crude isocytosine in a dilute aqueous sulfuric acid solution and filtering off acid soluble impurities therefrom.

3. A method of producing purified isocytosine in the form of its sulfate which comprises subjecting the reaction mixture obtained by the reaction of a guanidine salt with the reaction product of fuming sulfuric acid and malic acid to dilution with water until a dilute aqueous sulfuric acid dispersion is produced and filtering off acid soluble impurities therefrom.

JACKSON P. ENGLISH.